United States Patent
Iwai et al.

[11] Patent Number: 6,152,267
[45] Date of Patent: Nov. 28, 2000

[54] CALIPER STRUCTURE FOR LINK-TYPE FRONT SUSPENSION

[75] Inventors: Toshiyuki Iwai; Shinji Ito, both of Saitama, Japan

[73] Assignee: Honda Giken Kogyo Kabushiki Kaisha, Tokyo, Japan

[21] Appl. No.: 09/158,833

[22] Filed: Sep. 23, 1998

[30] Foreign Application Priority Data

Sep. 23, 1997 [JP] Japan .................................. 9-276407
Oct. 3, 1997 [JP] Japan .................................. 9-271199

[51] Int. Cl.$^7$ ....................................................... B62L 5/00
[52] U.S. Cl. .......................... 188/26; 188/18 A; 188/71.1
[58] Field of Search .................................... 188/18 A, 26, 188/58, 71.1, 73.47, 280; 303/9.64

[56] References Cited

U.S. PATENT DOCUMENTS

| | | | |
|---|---|---|---|
| 4,343,380 | 8/1982 | Kawaguchi | 188/18 A |
| 4,550,809 | 11/1985 | Kawaguchi | 188/18 A |
| 4,703,839 | 11/1987 | Nakano et al. | 188/346 |
| 4,732,241 | 3/1988 | Yoshida | 188/73.34 |
| 4,775,163 | 10/1988 | McGowan et al. | 280/277 |
| 4,889,205 | 12/1989 | Yoshimi | 180/227 |
| 5,186,274 | 2/1993 | Hegman | 180/227 |
| 5,775,454 | 7/1998 | Scherbarth et al. | 180/219 |

FOREIGN PATENT DOCUMENTS

| | | |
|---|---|---|
| 2-20157 | 6/1990 | Japan . |
| 08216964 | 8/1996 | Japan . |

*Primary Examiner*—Michael Mar
*Assistant Examiner*—Bradley King
*Attorney, Agent, or Firm*—Birch, Stewart, Kolasch & Birch, LLP

[57] ABSTRACT

To arrange a mounting portion of a disk brake in such a manner as to not be offset from a bearing portion of a caliper bracket. A large diameter disk flange is formed on one side surface of a hub of a front wheel. An inner peripheral end portion of a disk brake is mounted on the disk flange. A small diameter boss is formed inside the disk flange on the hub. An inner end of a bracket boss formed integrally with a caliper bracket is fitted in an inner surface of the projecting end of the boss. The bracket boss is supported by inner and outer bearings on the axle. A center of the disk brake passes through a portion between the inner and outer bearings side. Accordingly, the mounting portion for mounting the disk brake on the disk flange is not offset from the bearing portion composed of the outer bearing and the inner bearing of the bracket boss. Furthermore, a torque link is provided connected between the caliper and the fork pipe of the motorcycle suspension so that the caliper bracket does not receive a braking force.

22 Claims, 4 Drawing Sheets

CALIPER STRUCTURE FOR LINK-TYPE FRONT SUSPENSION

BACKGROUND OF THE INVENTION

1. Field of the Invention

The present invention relates to a disk brake device for a motorcycle. Furthermore, the present invention relates to a caliper structure for a front wheel brake, which is suitable for a motorcycle including a link-type front suspension.

2. Description of Related Art

A general disk brake device for a motorcycle includes a disk brake mounted on the hub of a wheel supported on the vehicular body side through an axle; a brake caliper for braking the disk brake; and a caliper bracket, turnably supported on the axle through a bearing, for supporting the brake caliper. In such a disk brake device, the mounting position of the disk brake is often offset from the bearing position of the caliper bracket. In some cases, however, it is desired to adopt a non-offset arrangement type for the disk brake device.

Japanese Utility Model Publication No. Hei 2-20157 discloses a disk brake device for the rear wheel of a motorcycle, which adopts such a non-offset arrangement type. In this device, a hub end plate has a connecting projection at a central portion formed into an approximately rectangular shape and mounted on a side surface of a hub of the rear wheel; a thick boss having a connecting recess to be fitted with the above connecting projection is mounted to an inner peripheral portion of the disk brake; and the hub end plate is integrally rotatably connected to the disk brake by fitting the connecting projection in the connecting recess.

A bracket boss of a caliper bracket is supported on an axle through a needle bearing, and is relatively rotatably fitted inside the above boss of the disk brake through a ball bearing provided on the outer peripheral portion of the bracket boss. The needle bearing and the ball bearing are coaxial with each other, and are overlapped with each other at a position through which the rotational plane of the disk brake passes.

With this configuration, since the outer periphery of the bracket boss of the caliper bracket is fitted inside the boss of the disk brake and the boss of the disk brake is supported by the hub, it is possible to enhance the supporting rigidity of the boss of the caliper bracket, and since the disk brake is disposed in such a manner that the rotational plane thereof passes through the bearing, it is possible to obtain the non-offset arrangement type structure.

While it is effective to extend the span of a bearing portion supported on the axle for enhancing the supporting rigidity of the bracket boss, a needle bearing has a limitation in sufficiently extending the span thereof. In the above example using the needle bearing, to enhance the supporting rigidity of the bracket boss having a relatively short span, it is required to provide the hub end plate and the boss of the disk brake, each of which is very heavy. This increases the weight of the structure and the number of parts, and complicates the structure. Also, the outer periphery of the bracket boss, which must be rotatably supported by the boss of the disk brake, is required not to be loosely fitted but to be accurately fitted in the boss of the disk brake. As a result, the bracket boss must be finely machined and finely assembled in the disk brake.

With regard to the caliper structure in the related art, U.S. Pat. No. 4,775,163 discloses a link-type front suspension for a motorcycle. The link-type front suspension includes a pair of right and left front forked portions which extend in the vertical direction with a front wheel located therebetween. Upper ends of the front forked portions are steerably supported by a body frame. In addition, a pair of right and left push rods are disposed substantially in parallel to the front forked portions; pivot links are rotatably mounted on lower ends of the front forked portions; lower ends of the push rods support an axle of the front wheel; and damping devices connect upper ends of the push rods to the body frame.

In the above related art front suspension, one end of a caliper bracket is turnably supported around the axle of the front wheel; a caliper for a front wheel brake is mounted on the other end of the caliper bracket; and the caliper bracket is connected to the front forked portion with a torque link.

Incidentally, such a caliper is generally of a pin-slide type in which a braking force is transmitted from the caliper to the caliper bracket and is further transmitted to the front forked portion through the torque link. As a result, the caliper bracket functioning as a braking force receiving member is required to have a high rigidity, and thereby it is increased in weight and it is required to be formed from an expensive high grade material. Furthermore, the caliper bracket is generally offset in the lateral direction from the center of the vehicular body, and accordingly, if the caliper bracket is increased in weight, it is difficult to take a balance of the caliper structure on the right and left sides and to lower the unsprung weight.

SUMMARY OF THE INVENTION

Accordingly, a first object of the present invention is to adopt a non-offset arrangement type structure and to solve the above problems relating thereto.

To solve the above problems, according to the present invention, there is provided a disk brake device for a motorcycle including a wheel supported on a vehicular body side through an axle; a disk brake mounted on a hub of the wheel; a brake caliper for braking the disk brake; and a caliper bracket, turnably supported on the axle through a bearing, for supporting the brake caliper, characterized in that the disk brake is mounted on a large diameter disk flange formed on a side surface of the hub; and a bracket boss of the caliper bracket is supported on the axle through an outer bearing and an inner bearing disposed apart at both inner axial ends of the bracket boss, and an end portion of the bracket boss on the inner side of the vehicular body is inserted inside the disk flange, whereby a rotational plane of the disk brake passes through a portion between the inner and outer bearings.

According to the present invention, since the outer bearing and inner bearing are disposed apart at both of the inner ends of the bracket boss, it is possible to sufficiently extend the span between the inner and outer bearings and hence to enhance the supporting rigidity of the bracket boss on the axle. As a result, unlike the above-described known example, it is not required to fit the outer periphery of the bracket boss in a boss additionally provided on the disk brake through a bearing.

Accordingly, a non-offset arrangement in which the rotational plane of the disk brake passes through a portion between the inner and outer bearings can be thus realized only by mounting the disk brake on the disk flange, that is, without the need of provision of any special heavy member. This reduces the weight and the number of parts, and simplifies the structure. Further, the bracket boss, which is only loosely fitted inside the disk flange, is not required to be finely machined for forming a high accurate bearing plane and finely assembled in the boss of the disk brake.

A second object of the present invention is to provide a caliper structure wherein the caliper bracket does not receive a braking force and to solve the above problems relating thereto.

Accordingly, according to the present invention, there is provided a caliper structure for a link-type front suspension used for a motorcycle including a link-type front suspension for supporting an axle of a front wheel by first-ends of pivot links which are connected to lower ends of front forked portions and also connected to damping devices, wherein one end of a caliper bracket is supported around the axle of the front wheel and a caliper for a front wheel brake is supported by the other end of the caliper bracket, characterized in that the caliper is of an opposed type, and one end of a torque link having the other end previously connected to the front forked portion is directly connected to the caliper.

In addition, according to the present invention, a stay is formed integrally with the caliper in such a manner as to project therefrom and a torque link is connected to the stay.

According to the caliper structure of the present invention, since the caliper is of an opposed type and the torque link is directly connected to the caliper, the caliper directly receives a braking force upon braking, and unlike the conventional caliper structure, the caliper bracket does not receive a braking force.

As a result, it is not required to greatly enhance the rigidity of the caliper bracket. This is effective to reduce the size and weight of the caliper bracket and hence to lower the unsprung weight, and also to form the caliper bracket from an inexpensive general grade material rather than an expensive high grade material.

Meanwhile, the caliper, which is essentially formed from a high rigid material, is capable of sufficiently receiving a braking force. Furthermore, since the caliper is located at a position closer to the center side of the vehicular body, it is possible to easily balance the caliper structure on the right and left sides.

According to the present invention, since the stay is formed integrally with part of the caliper in such a manner as to project therefrom, it is possible to sufficiently increase the rigidity of the stay and to easily form the stay. Furthermore, both the stay and the torque link connected to the stay can be disposed on the center side of the vehicular body.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus are not limitative of the present invention, and wherein.

DESCRIPTION OF THE PREFERRED EMBODIMENTS

Figure 1:
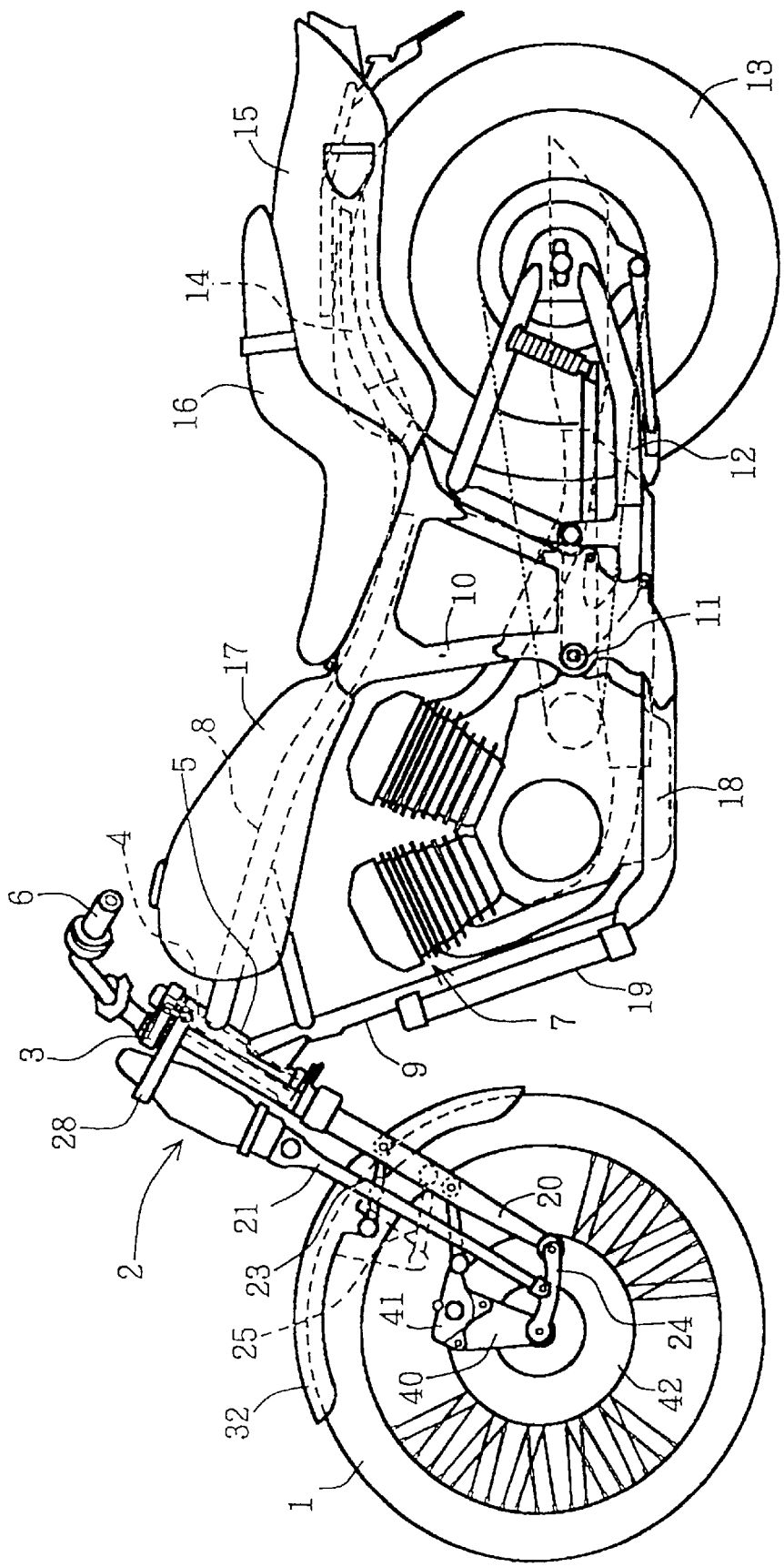
FIG. 1 is a general side view of a motorcycle to which the present invention is applied.

Hereinafter, one embodiment of the present invention will be described with reference to FIGS. 1 to 3. Referring first to FIG. 1, a link-type front suspension 2 for supporting a front wheel 1 is turnably connected to a head pipe 5 by means of a stem pipe 4 through a top bridge 3, to be thus steerable by a handlebar 6.

The head pipe 5 is mounted to a front end of a main pipe 8 disposed over a V-type four cycle engine 7 in the longitudinal direction and to a front end of a front down pipe 9 obliquely downward in front of the engine 7.

A rear portion of the main pipe 8 is connected to a pair of right and left pivot plates 10 extending longer in the vertical direction. Rear swing arms 12 extend rearward from the pivot plates 10 with front ends thereof supported by pivot portions 11 of the pivot plates 10. A rear wheel 13 is supported by rear ends of the rear swing arms 12. The rear swing arms 12, which are rockable in the vertical direction around the pivot portions 11, function as a rear suspension.

Seat rails 14 extend rearward from a rear portion of the main pipe 8. A rear cowl 15 and a seat 16 are supported on the seat rails 14. A fuel tank 17 is supported on the main pipe 8 in front of the seat 16.

A lower end of the front down pipe 9 is connected to lower ends of the pivot plates 10 through lower frames 18 extending under the engine 7 in the longitudinal direction. A radiator 19 is supported on the front down pipe 9.

Figure 2:
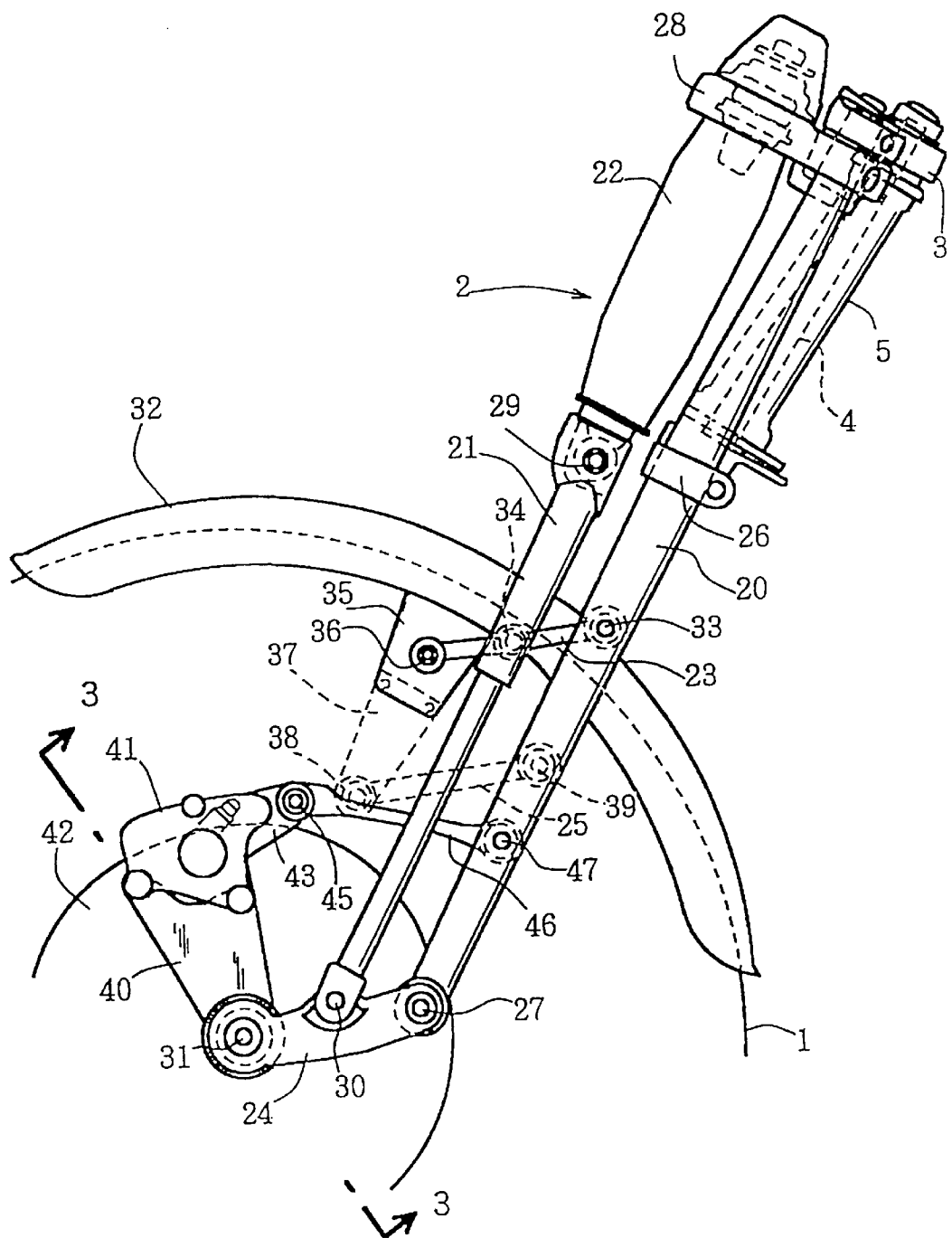
FIG. 2 is an enlarged side view of a link-type front suspension portion.

Referring to FIG. 2, the link-type front suspension 2 includes forked pipes 20; push rods 21 and damping devices 22 disposed in parallel to the forked pipes 20; upper links 23 for connecting vertically-intermediate portions of the push rods 21 to those of the forked pipes 20; and pivot links 24 for connecting lower ends of the push rods 21 to those of the forked pipes 20. These components 20, 21, 22, 23 and 24 make respective right and left respective pairs.

The forked pipe 20 disposed on the right side of the vehicular body includes a fender link 25 having one end connected to a vertically-intermediate portion of the forked pipe 20 between the points connected to the upper link 23 and the pivot link 24 and the other end connected to a front fender (which will be described later).

Upper ends of the right and left forked pipes 20 are connected to the top bridge 3 and intermediate portions thereof are connected to a steering stem 26. A central portion of the top bridge 3 is connected to a central portion of the steering stem 26 through the stem pipe 4 which is turnably supported in the head pipe 5.

The forked pipe 20 is a tapered pipe member having such a shape that an upper side from the portion connected to the steering stem 26 is tapered upward and a lower side therefrom is similarly tapered downward. The forked pipe 20 can be produced by a known method, for example, by swaging a straight pipe member obtained by extrusion into a tapered shape. A lower end of the forked pipe 20 is rotatably mounted on one end of the pivot link 24 through a shaft 27.

The damping device 22 is of a known hydraulic damper type containing a damper spring. An upper end of the damping device 22 is supported by a front portion of an upper bracket 28 and a lower end thereof is rotatably mounted on an upper end of the push rod 21 through a shaft 29.

The push rod 21 is a pipe member extending downward substantially in parallel to the forked pipe 20. A lower end of the push rod 21 is rotatably mounted on an intermediate portion of the pivot link 24 through a shaft 30. The other end of the pivot link 24 is rotatably mounted on an axle 31 of the front wheel 1.

The upper links 23 are disposed in the vicinity of a front fender 32 between the right and left forked pipes 20 and between the right and left push rods 21. One end of the upper link 23 is rotatably mounted on the forked pipe 20 through a shaft 33 and an intermediate portion thereof is rotatably mounted on the push rod 21 through a shaft 34. The length of the upper link 23 between the shafts 33 and 34 is nearly equal to the length of the pivot link 24 between the shafts 27 and 31.

The forked pipe 20, push rod 21, upper link 23 and pivot link 24 thus form an approximately parallelogram link mechanism which allows the push rod 21 to be moved substantially in parallel to the forked pipe 20 when the front wheel 1 is moved up and down.

Front ends of the right and left upper links 23 extend forward from the push rods 21, and are rotatably mounted through shafts 36 on stays 35 projecting downward from the front fender 32.

The fender link 25, which is disposed on the right side of the vehicular body as described above, extends under the mounting position of the upper link 23 substantially in parallel to the upper link 23. One end of the fender link 25 is rotatably mounted through a shaft 38 on a stay 37 extending further downward from the stay 35 provided on the right side of the front fender 32, and the other end thereof is rotatably mounted on the forked pipe 20 through a shaft 39.

A line connecting the shaft 36 of the stay 35 to the shaft 38 of the stay 37 is substantially parallel to an axial line of the forked pipe 20. Thus, on the right side of the vehicular body, the upper link 23, fender link 25, stays 35 and 37 of the front fender 32, and forked pipe 20 form an approximately parallelogram link mechanism which allows the front fender 32 to be moved substantially in parallel to the front wheel 1, that is, up and down when the front wheel 1 is moved up and down.

One end of a caliper bracket 40 is turnably mounted around the axle 31, and a caliper 41 is supported on the other end of the caliper bracket 40. Upon braking, the caliper 41 is brought in slide-contact with a disk brake 42, to be thus directly applied with a braking force.

A stay 43 is integrally formed on the caliper 41 in such a manner as to project rearwardly therefrom. One end of a torque link 46 is rotatably mounted on the stay 43 through a shaft 45 and the other end thereof is rotatably mounted on the forked pipe 20 through a shaft 47.

Figure 3:
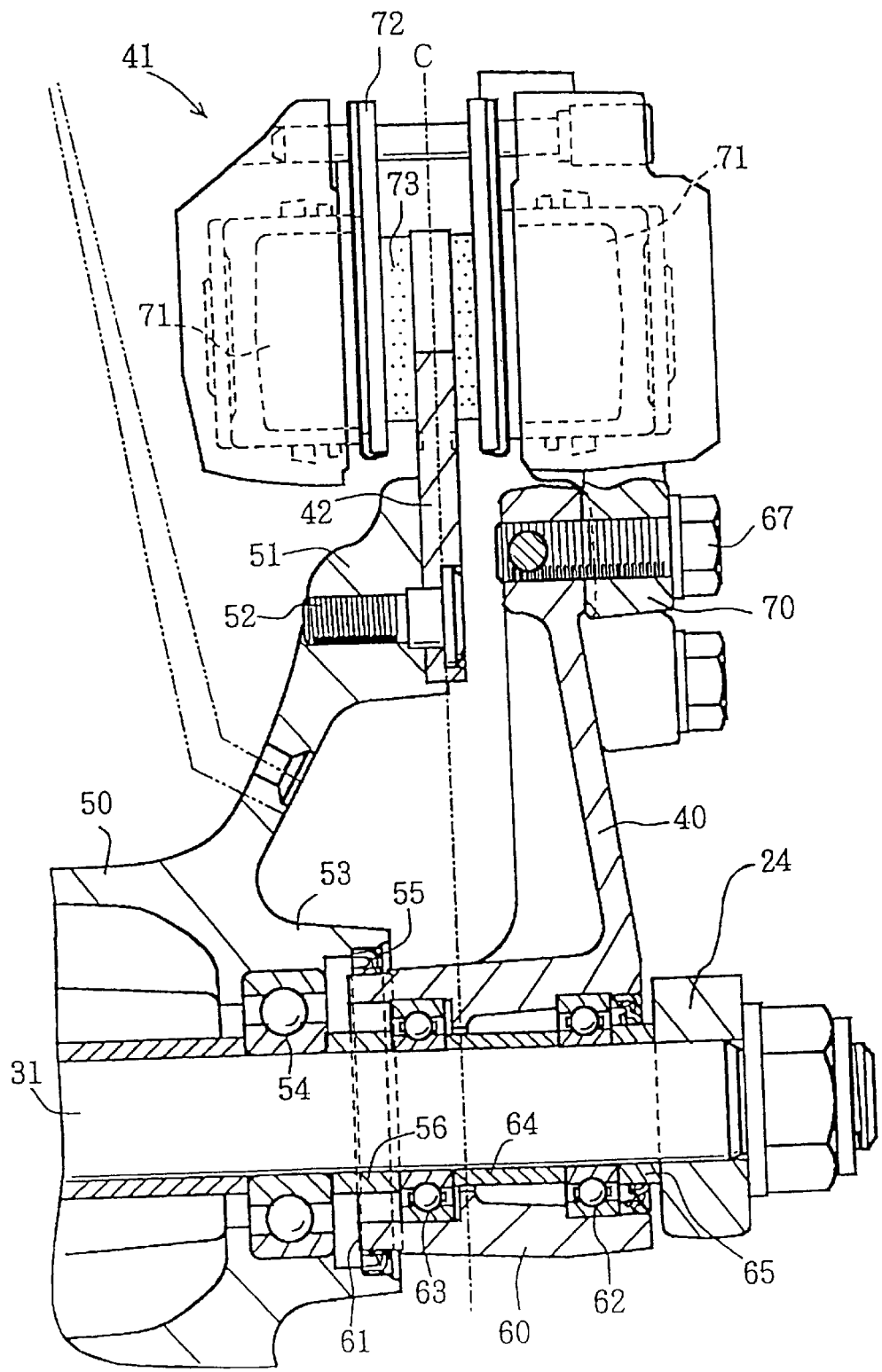
FIG. 3 is a sectional view taken on line 3—3 of FIG. 2.

Referring to FIG. 3, a large diameter disk flange 51 is formed on one side surface of a hub 50 of the front wheel, and an inner peripheral end portion of a disk brake 42 constituting the front wheel brake device is mounted on the disk flange 51 with a bolt 52. A small diameter boss 53 projecting sideways is formed inside the disk flange 51. The boss 53 is rotatably supported on the axle 31 through a ball bearing 54 provided in the boss 53. A seal 55 is fitted in an inner face of the projecting end of the boss 53.

An inner end 61 of a bracket boss 60 formed integrally with the caliper bracket 40 is fitted in an inner periphery of the seal 55. The bracket boss 60 is formed into a cylinder extending in the axial direction of the axle 31, and is turnably supported on the axle 31 by an outer bearing 62 and an inner bearing 63 which are disposed apart at both inner and outer ends of the bracket boss 60 in the axial direction.

The outer bearing 62 and the inner bearing 63 are spaced from each other with a gap held therebetween by means of a collar 64 provided on the axle 31. In addition, a collar 65 is provided between the outer bearing 62 and the pivot link 24, and a collar 56 is provided between the inner bearing 63 and the ball bearing 54.

A main body of the caliper bracket 40 extends upward from the bracket boss 60. A mounting portion 70 of the brake caliper 41 is removably connected to an upper portion of the boss 60 with a bolt 67.

The brake caliper 41 has a pair of pistons 71 opposed to both surfaces of the disk brake 42. The pistons 71 are operated to push supporting plates 72 inwardly respectively, to bring brake pads 73 mounted on surfaces of the supporting plates 72 in sliding-contact with both of the surfaces of the disk brake 42.

A disk center C, which is a line passing through the center of the width of the disk brake 42, that is, extending in parallel to a rotational plane of the disk brake 42, passes through a portion outside the inner bearing 63 of the bracket boss 60 (on the outer bearing 62 side), and accordingly, the mounting portion for mounting the disk brake 42 on the disk flange 51 is not offset from the bearing portion composed of the outer bearing 62 and the inner bearing 63 of the bracket boss 60.

A function of this embodiment will be described below. When hydraulic pressure is supplied to the brake caliper 41 for a braking operation, one pair of the pistons 71 opposed to both of the surfaces of the disk brake 42 push the supporting plates 72 inwardly, respectively to bring the brake pads 73 into sliding-contact with both of the surfaces of the disk brake 42, thereby decelerating or stopping the rotation of the front wheel 1.

The braking force is transmitted from the disk brake 42 to the caliper bracket 40 through the brake caliper 41. At this time, since the disk center C passes through a portion on the outer bearing 62 side from the inner bearing 63 of the bracket boss 60 and thereby the mounting portion of the disk brake 42 is not offset from the bearing portion of the bracket boss 60, the degree of twisting between the mounting portion of the disk brake 42 and the brake caliper 41 is made smaller than that in the case of the offset arrangement, to thereby reduce problems caused by the twisting.

Since the outer bearing 62 and inner bearing 63, each of which is a ball bearing, are disposed apart at both of the inner and outer ends of the bracket boss 60, the span between the inner and outer bearings can be sufficiently extended. This enhances the supporting rigidity of the bracket boss 60 on the axle 31.

Accordingly, unlike the above-described known example, in order to ensure the supporting rigidity of the bracket boss 60, it is not required to provide the hub end plate and the boss of the disk brake, each of which is a special heavy member, and to fit the hub end plate in the boss through a bearing provided in the boss. That is, in this embodiment, the disk brake 42 is only mounted on the disk flange 51 without use of any special member. This makes it possible to simply realize a non-offset arrangement without increasing the weight and the number of parts.

The bracket boss 60, which is only fitted in the seal 55 provided in the small diameter boss 53 formed inside the disk flange 51, is not required to be finely machined for forming a high accurate bearing plane and to be assembled in a bearing portion. This makes for easy manufacture of the disk brake device.

Figure 4:
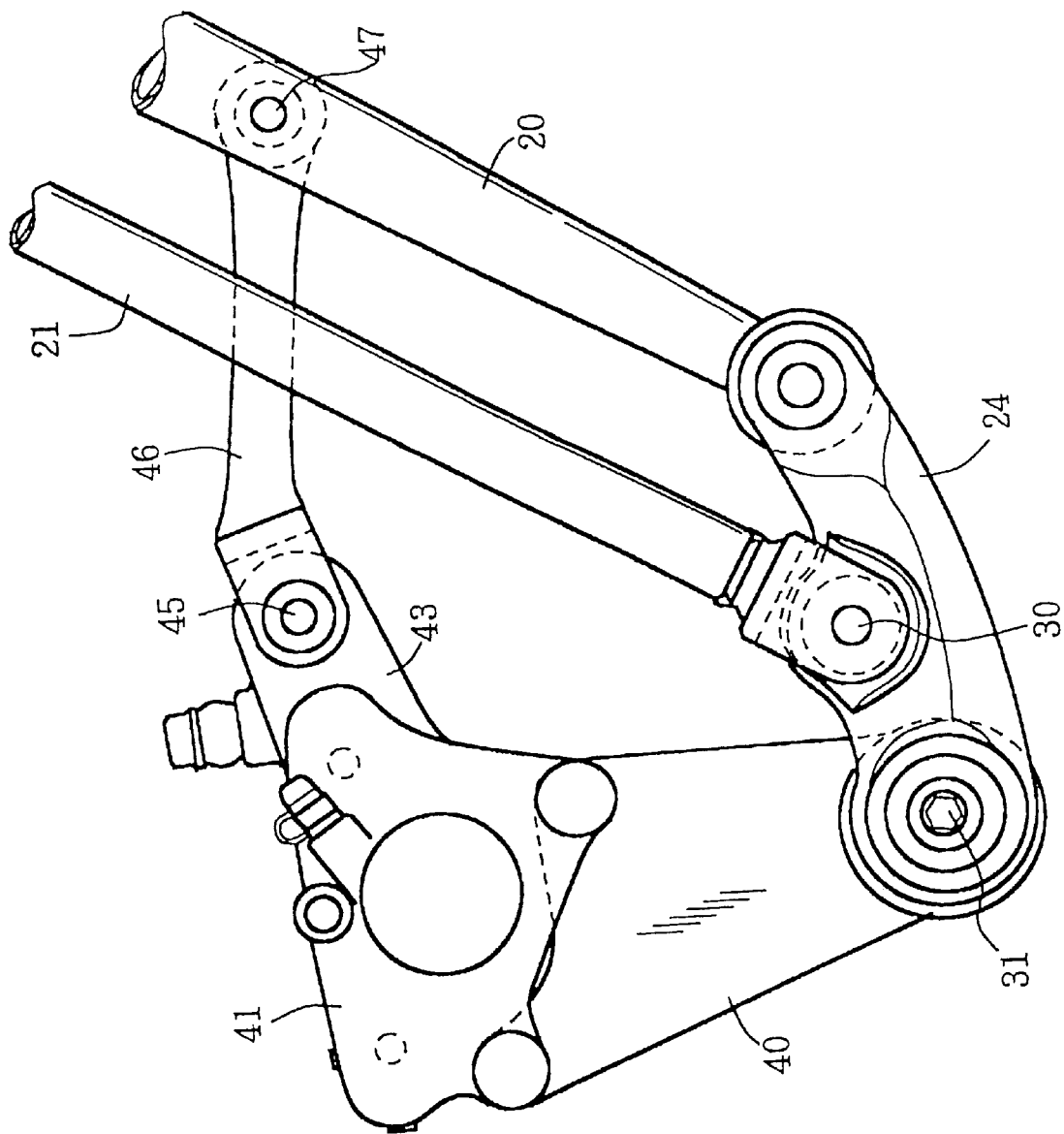
FIG. 4 is a side view showing a structure for supporting a caliper structure.

A function of the caliper structure of the present invention will be described below with reference to FIG. 4. In the link-type front suspension 2, the push rods 21, which are supported by a double link mechanism composed of the upper links 23 and the pivot links 24, are moved up and down in such a manner as to be parallel to the forked pipes 20. The push rods 21, which are also turnably connected to the lower ends of the damping devices 22 by the shafts 29, are not subjected to bending and therefore are smoothly moved. A shock applied to the push rods 21 is absorbed by the damping devices 22.

The upper link 23, pivot link 24, and fender link 25 are substantially parallel to each other and nearly equal in length to each other. Consequently, the front fender 32 is moved with a stroke which substantially corresponds to that of the axle 31.

At this time, the caliper 41 of the opposed type, which is connected to the forked pipe 20 through the torque link 46, directly receives a braking force upon braking, and it transmits the braking force to the forked pipe 20 through the stay 43 and the torque link 46. Unlike the conventional caliper structure, the caliper bracket 40 does not receive a braking force.

As a result, it is not required to greatly enhance the rigidity of the caliper bracket 40. This is effective to reduce the size and weight of the caliper bracket 40 and hence to lower the unsprung weight, and to allow the caliper bracket 40 to be formed from an inexpensive general grade material rather than from an expensive high grade material.

The caliper 41, which is essentially formed from a high rigid material, is capable of sufficiently receiving a braking force. The stay 43 formed integrally with part of the caliper 41 is also allowed to have a sufficient rigidity, and it can be easily formed.

Since the caliper 41 is located at a position closer to the center side of the vehicular body and both the stay 43 and the torque link 46 are also disposed on the center side of the vehicular body, it is possible to easily balance the caliper structure on the right and left sides.

It should be noted that the present invention is not limited to the above-described embodiment, and various changes may be made without departing from the spirit and scope of the present invention. For example, the present invention can be applied to a rear wheel brake in addition to a front wheel brake. In this case, the present invention can be applied to either a type in which a suspension has a pair of right and left rear arms or a cantilever type in which a suspension has only one rear arm.

The invention being thus described it will be obvious that the same may be varied in many ways. Such variations are not to be regarded as a departure from the spirit and scope of the invention, and all such modifications as would be obvious to one skilled in the art are intended to be included within the scope of the following claims.

We claim:

1. A disk brake device on a motorcycle comprising:
   a wheel supported on a body of the motorcycle through an axle;
   a disk brake mounted on a hub of said wheel;
   a brake caliper for braking said disk brake; and
   a caliper bracket, turnably supported on the axle through a bearing, for supporting said brake caliper, the improvement comprising:
   said disk brake is mounted on an end of a large diameter disk flange formed on a side surface of the hub and extending radially, obliquely outwardly from said hub;
   a bracket boss of said caliper bracket is supported on the axle through an outer bearing and an inner bearing disposed apart at both inner and outer axial ends of said bracket boss; and
   an end portion of said bracket boss is inserted inside said disk flange, and wherein a rotational plane of said disk brake passes through a portion of said bracket boss between said inner and outer bearings.

2. The disk brake device according to claim 1, wherein said hub includes a boss extending from said side surface and terminating inside said disk flange, said boss receiving said end portion of said bracket boss.

3. The disk brake device according to claim 2, wherein said boss on said hub is supported on said axle by a bearing, said bearing being coaxial with the bearings in the bracket boss.

4. The disk brake device according to claim 1, wherein said caliper bracket extends radially outwardly from said bracket boss, said brake caliper being mounted on an end of said caliper bracket.

5. A disk brake device on a motorcycle comprising:
   a wheel supported on a body of the motorcycle through an axle;
   a large diameter disk flange formed on a side surface of a hub of said wheel, said large diameter disk flange extending radially, obliquely outwardly from said hub;
   a disk brake mounted on an end of said large diameter disk flange;
   a caliper bracket having a boss formed thereon, said boss being supported on the axle through outer and inner bearings, an end portion of said boss being supported by said hub inside said disk flange;
   a brake caliper for braking said disk brake supported on said caliper bracket; and
   wherein a rotational plane of said disk brake passes through a portion of said boss between said inner and outer bearings.

6. The disk brake device according to claim 5, wherein said hub includes a boss extending from said side surface and terminating inside said disk flange, said boss of said hub receiving said end portion of said boss of said caliper bracket.

7. The disk brake device according to claim 6, wherein said boss of said hub is supported on said axle by a bearing, said bearing being coaxial with the outer and inner bearings in the boss of said caliper bracket.

8. The disk brake device according to claim 5, wherein said caliper bracket extends radially outwardly from said boss, said brake caliper being mounted on an end of said caliper bracket.

9. A caliper structure on a motorcycle, the motorcycle having a front suspension for supporting an axle of a front wheel with a first end of a pivot link connected to a lower end of a front forked portion, and wherein the caliper structure includes a caliper bracket having one end supported around the axle of the front wheel and a caliper for a front wheel brake is supported by another end of said caliper bracket, the improvement comprising said caliper being directly connected to one end of a torque link, another end of the torque link being connected to said front forked portion, said caliper structure further including:
   a large diameter disk flange formed on a side surface of a hub of said wheel;
   a disk brake mounted on said large diameter disk flange;
   said caliper bracket having a boss, supported on the axle through outer and inner bearings, an end portion of said boss being supported by said hub inside said disk flange; and wherein a rotational plane of said disk brake passes through a portion of said boss between said inner and outer bearings.

10. The caliper structure according to claim 9, wherein a stay is formed integrally with said caliper, said stay projects from said caliper and is connected to said torque link.

11. The caliper structure according to claim 10, wherein the torque link is connected to said front forked portion at a location above the connection of said pivot link.

12. The caliper structure according to claim 9, wherein a second end of the pivot link is supported around the axle of the motorcycle.

13. The caliper structure according to claim 12, wherein a push rod is connected to a center portion of the pivot link, the push rod being connected to a damping device of the motorcycle.

14. The caliper structure according to claim 9, wherein said hub includes a boss extending from said side surface inside said disk flange, said boss of said hub receiving said end portion of said boss of said caliper bracket.

15. The caliper structure according to claim 14, wherein said boss of said hub is supported on said axle by a bearing, said bearing being coaxial with the outer and inner bearings in the boss of said caliper bracket.

16. The disk brake device according to claim 9, wherein said disk flange extends radially, obliquely outwardly from said hub, said disk brake being mounted on an end of said disk flange.

17. The disk brake device according to claim 9, wherein said caliper bracket extends radially outwardly from said boss, said caliper being mounted on an end of said caliper bracket.

18. The disk brake device according to claim 1, wherein the axle of the motorcycle is supported on a front fork by a pivot link.

19. A disk brake assembly for a motorcycle, comprising:
 a hub having a large diameter disk flange formed on a side surface thereof, said large diameter disk flange extending radially, obliquely outwardly from said hub;
 a disk brake mounted on an end of said large diameter disk flange;
 a caliper bracket having a boss formed thereon, said boss being supportable on an axle of the motorcycle through outer and inner bearings, an end portion of said boss being supported by said hub inside said disk flange;
 a brake caliper for braking said disk brake supported on said caliper bracket; and
 wherein a rotational plane of said disk brake passes through a portion of said boss between said inner and outer bearings.

20. The disk brake assembly according to claim 19, wherein said hub includes a boss extending from said side surface and terminating inside said disk flange, said boss of said hub receiving said end portion of said boss of said caliper bracket.

21. The disk brake assembly according to claim 20, wherein said boss of said hub is supported on said axle by a bearing, said bearing being coaxial with the outer and inner bearings in the boss of said caliper bracket.

22. The disk brake assembly according to claim 19, wherein said caliper bracket extends radially outwardly from said boss, said brake caliper being mounted on an end of said caliper bracket.

* * * * *